INVENTORS
John W. G. Kershaw
Arthur W. Simmons
Edmund J. Page
BY A. A. Steinmiller
Attorney Jan. 24, 1967   J. W. G. KERSHAW ETAL   3,300,254
ELECTRO-PNEUMATIC BRAKE SYSTEM
Filed July 17, 1964   2 Sheets-Sheet 2
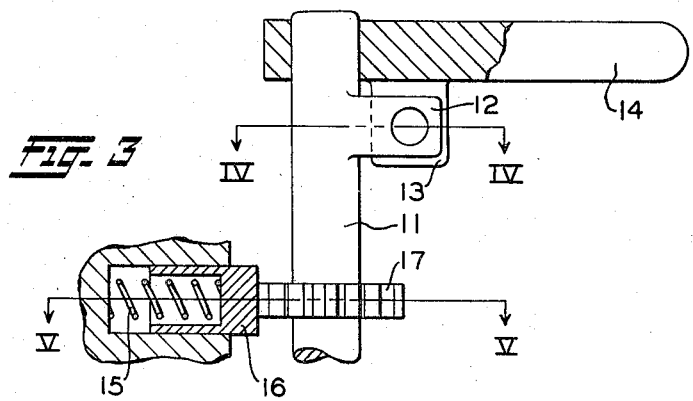
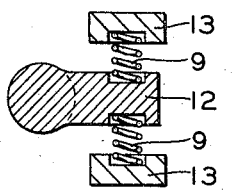
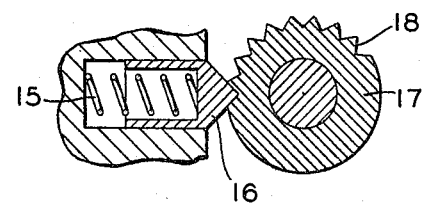
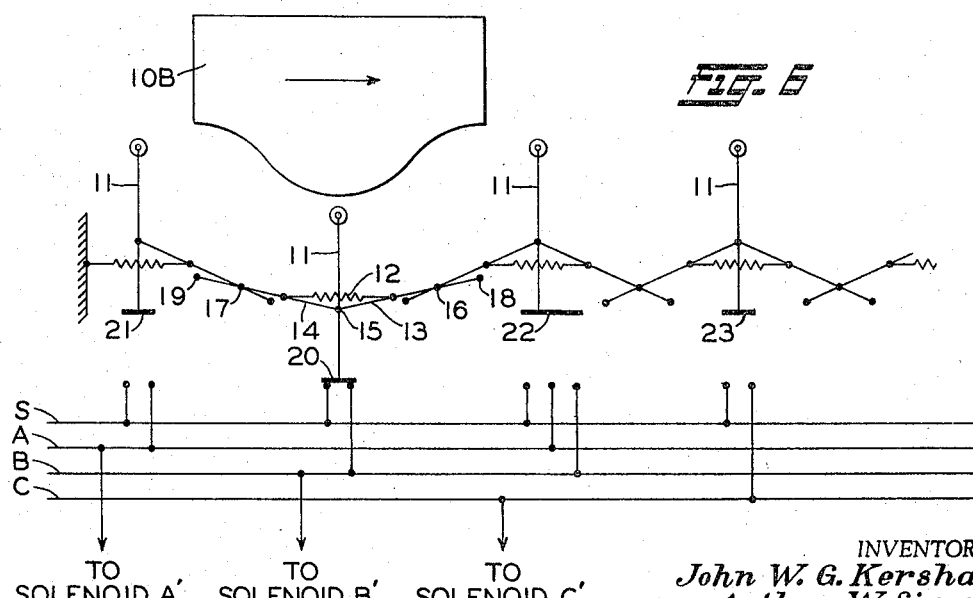
INVENTORS
John W. G. Kershaw
Arthur W. Simmons
Edmund J. Page
BY
Attorney United States Patent Office 3,300,254
Patented Jan. 24, 1967

3,300,254
ELECTRO-PNEUMATIC BRAKE SYSTEM
John W. G. Kershaw, Arthur W. Simmons, and Edmund J. Page, all of London, England, assignors to Westinghouse Brake & Signal Company, Ltd., London, England
Filed July 17, 1964, Ser. No. 383,357
Claims priority, application Great Britain, July 30, 1963, 30,145/63
4 Claims. (Cl. 303—20)

The present invention relates to an electro-pneumatic braking system for railway vehicles, and, more particularly, to a method of energizing the electro-pneumatic valves associated with such a system.

An electro-pneumatic braking system employing three wires energized selectively to give seven different combinations is well known. The present application provides an arrangement with three different wires A, B and C whereby the seven combinations can be arranged by manual operation of a control handle to give seven different values of output corresponding thereto: A; B; A and B; C; A and C; B and C; A, B and C. Additionally, if these three A, B and C are given a value of, say, A=1, B=2 and C=4, then the sequential energization of the wires as indicated above can be arranged to give sequential output in equal stages from 1 to 7.

A difficulty which must be overcome presents itself with regards to the method of changing from one position to another, that is to say from one combination, say, A to B; the successful dropping-out or opening of contact A and the picking-up or closing of contact B must be simultaneous and effected by one action. If there is any overlap or delay, then the following can occur: (a) if there is an overlap between the drop-out or opening of contact A and the pick-up or closing of contact B, then in passing from stage 1 to stage 2, the equivalent of stage 3 corresponding to A and B will be obtained for a short undesirable period. This short period may even be extended if the manual operation of the vehicle operator, in moving his handle to make the contacts, does so slowly or pauses in the overlap area. (b) Should there be a gap or delay between, say, the dropping of contact A and the picking-up of contact B, then for a short period the circuit would be broken, resulting in neither A nor B being energized and thus no circuit would be complete and the control output would drop to zero.

According to the present invention, there is provided an electro-pneumatic braking system comprising a plurality of electrical conductors each of which is arranged upon energization to effect the energization of an associated electro-magnetically controlled pneumatic valve which, in turn, effects the operation of a pneumatically-controlled pneumatic valve to regulate the degree of braking effected by the brakes of the system. The degree of braking thus effected is determined by that particular combination of the electro-magnetically controlled pneumatic valves which have been energized out of a predetermined series of combinations extending over the range of the degree of braking which can be effected. The energization of the combination of the pneumatic valves is effected by the energization of corresponding electrical conductors, by a brake controller having an actuable member movable through a range of possible movement, the position of which within that range determines the degree of braking to be effected. An arrangement is provided for a series of contactors through which the electrical conductors are energized, said arrangement being such that at least one of the contactors used in one combination for effecting the energizing of one of the conductors may be used in another combination of contactors to energize another conductor. The said contactor arrangement may utilize snap-action switch means by which it is ensured that movement of the actuable member throughout its range effects the substantially simultaneous making and/or breaking of the relevant contacts of the contactor arrangement in the progression through the series of combinations of energization of the conductors.

The substantially simultaneous making and/or breaking of the relevant contactors employing snap-action switch means is such that it will not permit an overlap or delay zone between the opening or closing operation of the desired combination of contacts of any considerable duration.

The invention will now be described in detail, by way of example only, with reference to the accompanying drawings, in which:

FIG. 3 is a side elevational view of a spring-loaded ratchet and pawl switching arrangement;

FIG. 4 is a cross-section view on the line IV—IV of FIG. 3;

FIG. 5 is a cross-section view on the line V—V of FIG. 3; and

FIG. 6 is a diagrammatic view of a cam-operated toggle snap switch arrangement.

Figure 1:
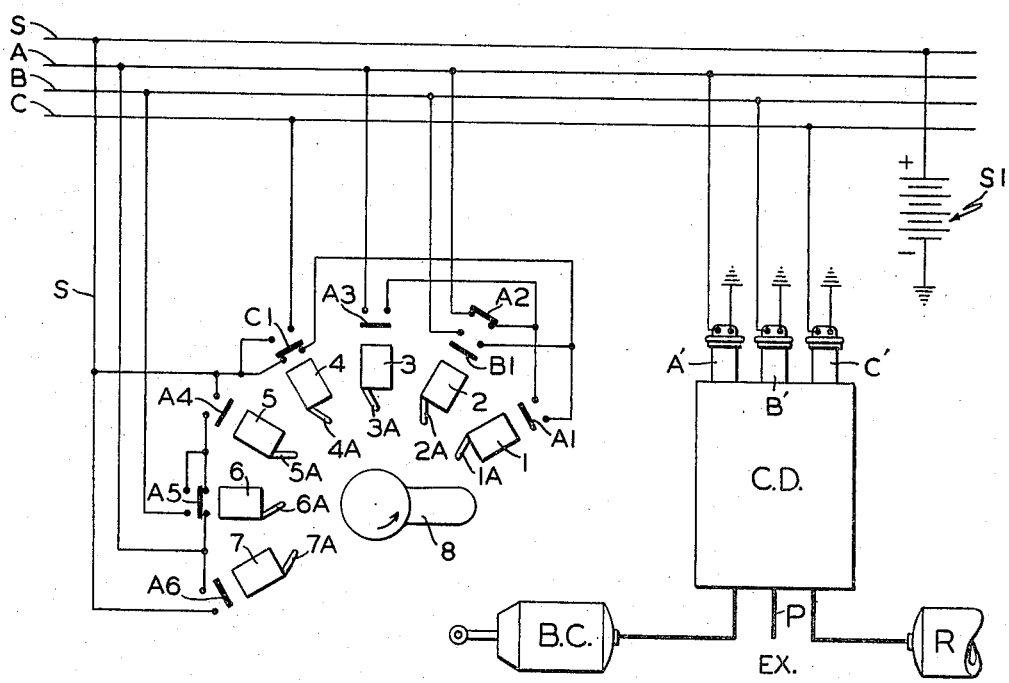
FIG. 1 is a diagram of a handle-operated snap switch arrangement.

Referring first to FIG. 1, it is proposed herein that the operation of the electrical contacts be arranged in the form of successively operable snap switches of any well-known snap-acting or toggle type where movement of a switch handle in one direction operates one or more switch contacts to one position and movement in an opposite direction operates the switch contacts to a second position. An understanding of the internal construction of the switches is not necessary for an understanding of the present invention, and is, therefore, not shown or described herein other than the brief description above. A handle 8 is movable in a counterclockwise direction to throw consecutively snap switches 1 to 7 from a first position, in which they are shown, to a second position to make and/or break circuits described hereinafter. Each snap switch performs the function of making and/or breaking contacts simultaneously. The satisfactory operation of the snap switch does not depend on the speed of movement of the handle. Reverse rotary movement of handle 8 in a clockwise direction after all switches are operated restores each snap switch progressively and in reverse order to its first position.

The snap switches 1 through 7 are connected up in a suitable manner so as to give the selected combination of closed contactors in a selected series to effect energization of the desired combination of electrical conductor wires A, B and C via the supply wire S from the battery source S1, as indicated hereinafter. In FIG. 1, the snap switches 1 through 7 are each thrown to an operated or second position by moving the toggle levers 1A through 7A, respectively, by movement of the cam 10, to a left-hand position as viewed from the face of each respective switch. Throwing of snap switch 1 to its second position closes contact A1 to effect completion of a circuit via the front side (the side shown in make position) of contact C1 and the closed contacts A1 and A2 to the wire A. Throwing of the snap switch 2 to its second position breaks contact A2 to open the just-described circuit to wire A and closes contact B1 to complete a circuit via the front side of contact C1 and the contact B1 to the wire B. Throwing snap switch 3 to its second position closes contact A3 with contacts B1 and A1 still closed to thereby give two complete parallel circuits, one each respectively to wire A and wire B. Throwing snap switch 4 to its second position opens or breaks the circuits previously described to wires A and B at the front side of the contact C1 and closes the back side of contact C1 to complete a circuit to wire C. Throwing the snap switch 5 to its second position closes contact A4 to complete a circuit via the front side (the side shown in make position) of contact A5 and a branch wire to the wire A, and with the back side of contact C1 still closed, two complete parallel circuits are made one each to the respective wires A and C. Throwing of snap switch 6 to its second position opens the front side of contact A5 and closes the back side of contact A5 to complete a circuit via a branch wire to wire B and opening the just-described circuit to wire A, and with the back side of contact C1 still closed, two complete parallel circuits are thereby made, one each respectively to the wires B and C. Throwing snap switch 7 to its second position closes contact A6 to complete a circuit via a branch wire to the wire A, and with the back side of contact A5 closed and the back side of contact C1 still closed, three complete parallel circuits are made, one each respectively to wires A, B and C.

Thus, briefly, closing of the switches 1 through 7 to their respective said second positions completes circuits to energize the wires A, B and C in seven stages in a sequence as follows:

(a) Snap switch 1 controls circuitry to wire A.
(b) Switch 2 controls circuitry to wire B.
(c) Switch 3 controls circuitry to wires A and B.
(d) Switch 4 controls circuitry to wire C.
(e) Switch 5 controls circuitry to wires A and C.
(f) Switch 6 controls circuitry to wires B and C.
(g) Switch 7 controls circuitry to wires A, B and C.

After the last snap switch 7 is operated to its second position, a reversal of rotation of the handle 8 causes a reverse sequence of operation of the snap switches to their original or first positions (with the toggle levers successively moved to the right as viewed from the face of said snap switches), thus causing a reverse sequence of completing seven different stages of circuitry, as just described above.

Energization of the different electrical conductor or train wires A, B and C in the different described combinations effects control of the different solenoids or magnet valves A', B', and C' on a control device C.D. to effect control of the different degrees of supply of fluid under pressure from a reservoir R to a brake cylinder B.C. or venting therefrom via an exhaust pipe P. to effect different degrees of braking, in a manner well known in the braking art.

Figure 2:
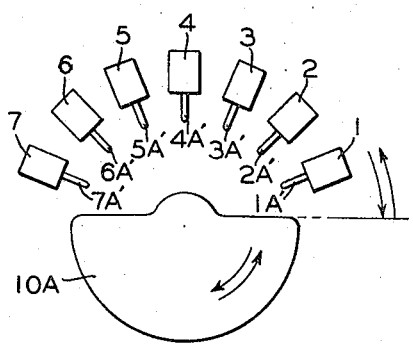
FIG. 2 is a diagrammatic view of a series of cam-operated snap switches.

In FIG. 2, a different arrangement for sequential operation of the snap switches is disclosed. In this case, the toggle levers 1A' to 7A' of snap switches 1 to 7 are operated by a semicircular cam member 10A designed to move from a normal or brake release position, in which it is shown, in a counterclockwise direction to operate the switches progressively. In this case, however, the toggle levers are spring-biased back from the operated positions in which they are held by cam 10A, to their original or first positions as the cam member is rotated reversely in a counterclockwise direction to swing clear of the switch levers.

Referring to FIGS. 3 and 5, a solution to the positioning of the brake valve handle is shown utilizing a spring-loaded cam and ratchet arrangement to give seven different positions in which the seven different snap switches may be operated by suitable cam means to control the sets of switches on the driver's brake valve, one switch being provided for each position of the handle. Each of these switches provides the necessary make and/or break of contacts to energize the required (A, B and C) three-wire combination.

To ensure that these switches be operated simultaneously where necessary, it is proposed that the handle 14 (FIG. 3) be made separate from the spindle 11 which operates the switches, the spindle being movable by the handle through spring loading therebetween, as shown in FIG. 4.

As shown in FIG. 4, the handle 14 not being rigidly connected to the spindle has limited rotation relative thereto. Attached to the spindle is a lug 12 which is shrouded on both sides by lugs 13 attached to the handle. Between each of the lugs 13 and the spindle lug is a spring 9.

As show in FIGS. 3 and 5, fixedly attached to the spindle is a plate 17 having notches 18 cut therein. A plunger 16 is adapted to engage in the notches, a spring 15 located between the plunger and a fixed part of the body of the mechanism helping to maintain this relationship.

In operation, when the handle 14 is moved, the spindle 11 is prevented from movement at first by the resistance of the plunger 16 and the spring 15 against the effort of one of the springs 9. As this movement continues, however, the compression of spring 9 increases until it overcomes the resistance of the plunger spring 15. When this occurs, the spindle, with its plate 17 and contacts (not shown) which are attached thereto, will be moved very quickly to the next position in a snap-action movement.

Referring finally to FIG. 6, there is disclosed yet another means and method by which the necessary contacts of the required combination in the selected series may be made and/or broken to operate pneumatic valves which, in turn, provide the corresponding desired stages of braking.

In this instance, seven (only four of which are shown) cam-operated toggle snap switches (described in more detail hereinafter) are employed. A cam 10B, attached to the driver's brake valve handle 14, moves progressively and in succession over the switches and, in doing so, forces a plunger-like rod 11, on which contact terminals are fitted, downwards to close the circuit of a selected combination of contacts from the supply wire S to the wires A, B and C in different combinations, similar to that described in connection with FIG. 1.

For example, the second snap switch from the left-hand end is shown in FIG. 6 in its actuated position. In moving the rod 11 downwards, the cam has to act against the force of a small tension spring 12 which is located between two arm members 13 and 14 pivoted at a point 15 on the rod. The arm members 13 and 14 extend through fixedly located slots 16 and 17 in the switch casing structure, respectively, to allow the rod to be pushed to an over-center position from which it makes and/or breaks contact. Lugs 18 and 19 on the ends of the arms 13 and 14, respectively, are adapted to make cooperative contact with the arms of adjacent rods, such that when one rod snaps over-center, a lug will engage an arm of the adjacent rod if that rod has been previously pushed over-center to snap the latter back again simultaneously with the over-center movement of the former. When the rod 11 is downward, a contactor 20 completes circuitry to energize the B wire in a manner similar to that described in connection with FIG. 1. Similarly, when contactor 21 is closed, the A wire is energized; when contactor 22 is closed, the A and B wires are energized; when contactor 23 is closed, the C wire is energized, etc., with different addition contactors (not shown) completing different circuits to effect the different combinatons of energization in a sequence similar to that described in connection with FIG. 1.

Having now described the invention, what we claim as new and desire to secure by Letters Patent, is:

1. A switch controller device comprising a plurality of switch devices disposed in a circular pattern about a central axis, each having a snap-acting operating arm extending therefrom toward said central axis movable from a first operating position to a second operating position and from said second operating position to said first operating position to effect corresponding snap-action operation of the switch devices, and a manually operated rotatable selector arm extending from said central axis radially toward said circular pattern in a manner to engage each of said operating arms individually and in succession to move said operating arms from a first operating position to a second operating position with a snap action when the selector arm is rotated in one direction and from said second operating position to said first operating position with a snap action when the selector arm is rotated in a reverse direction.

2. An electro-pneumatic braking system comprising, in combination,
   (a) a source of fluid under pressure,
   (b) a brake cylinder operable to effect a brake application when pressurized and to effect a release of the brake application when depressurized,
   (c) a plurality of electro-responsive valve devices energizable individually and in different selected combinations thereof for selectively effecting different degrees of pressurization of said brake cylinder,
   (d) a plurality of switch means operable in sequence to energize said electro-responsive valve devices individually and in different selected combinations, and
   (e) manually operated means movable in one direction for operaitng said switch means in a selected sequence and in a reverse direction for operating said switch means in a reverse sequence,
   (f) said plurality of switch means being disposed in a circular pattern about a central axis, each switch means having an operating arm extending therefrom toward said central axis and being movable from a first operating position to a second operating position and from said second operating position to said first operating position to effect corresponding operation of the switch devices,
   (g) said manually operated means being rotatable about said central axis in a manner to successively engage and move said operating arms from a first position to a second position in the selected sequence as said manually operated means is rotatably moved in said one direction and from said second position to said first position in the reverse sequence as said manually operated means is rotatably moved in the said reverse direction,
   (h) said operating arms of said switch means being snap-acting from said first position to said second position and from said second position to said first position to effect corresponding snap action of the switch devices,
   (i) said manually operated means having a rotatable arm extending from said central axis radially toward said circular pattern of switch means in a manner to engage each of said operating arms individually and in succession to move them from said first position to said second position with a snap action when the rotary arm is moved in said one direction, and from said second position to said first postion with a snap action when the rotary arm is moved in the said reverse direction.

3. An electro-pneumatic braking system comprising, in combination,
   (a) a source of fluid under pressure,
   (b) a brake cylinder operable to effect a brake application when pressurized and to effect a release of the brake application when depressurized,
   (c) a plurality of electro-responsive valve devices energizable individually and in different selected combinations thereof for selectively effecting different degrees or pressurization of said brake cylinder,
   (d) a plurality of two-position switch means disposed in a circular pattern about a central axis, each switch means having an operating arm extending therefrom toward said central axis and being movable from a first operating position to a second operating position against the yielding resistance of a spring means which biases the operating arm from said second operating position to said first operating position, to effect corresponding operation of the switch devices,
   (e) manually operated means including a cam device having an arcuate actuating surface of a uniform radius sufficient to move each operating arm of each switch means successively from said first position to said second position and maintain it therein against the spring-bias when said cam device is rotated about said central axis in the said one direction from an initial position and to permit the spring-biased operating arms of switch means to be returned automatically and successively from the said second position to the said first position as the actuating surface of said cam device disengages the operating arms when the cam device is rotated about said central axis in the said reverse direction toward said initial position, and
   (f) circuitry means interconnecting said switch means with one another and with said electro-responsive means in a manner such that one or more switch means cooperates to effect energization of said electro-responsive valve means individually and in such different selected combinations as to provide progressively increasing degrees of pressurization of said brake cylinder upon movement of said manually operated means in one direction and progressively decreasing degrees of pressurization of said brake cylinder upon movement of said manually operated means in the reverse direction.

4. In an electro-pneumatic braking system, control apparatus comprising in combination:
   (a) a pneumatic controller operable to effect different degrees of braking control,
   (b) three electro-responsive valve devices operably energizable and deenergizable in different selected combinations to control operation of said pneumatic controller,
   (c) a source of electrical supply,
   (d) three control wires, one for each of said electro-responsive valve devices, via which energizing current is supplied to said devices from said source,
   (e) a plurality of two-position switch devices comprising:
      (i) a first switch means operable out of one position to a second position for establishing a first circuit to energize a first control wire to effect a first braking condition,
      (ii) a second switch means operable out of one position to a second position for interrupting said first circuit and establishing a second circuit to energize a second control wire to effect a second braking condition,
      (iii) a third switch means operable out of one position to a second position for establishing a third circuit includng said second circuit connected in parallel to energize said first and second control wires to effect a third braking condition,
      (iv) a fourth switch means operable out of one position to a second position for interrupting said third circuit and establishing a fourth circuit to energize a third control wire to effect a fourth braking condition,
      (v) a fifth switch means operable out of one position to a second position for establishing a fifth circuit including said fourth circuit connected in parallel to energize said first and third control wires to effect a fifth braking condition,
      (vi) a sixth switch means operable out of one position to a second position for interrupting said fifth circuit and establishing a sixth circuit including said fourth circuit connected in parallel to energize said second and third control wires to effect a sixth braking condition,
      (vii) a seventh switch means operable out of one position to a second position for establishing a seventh circuit including said sixth and said fourth circuit connected in parallel to energize said first, second and third control wires to effect a seventh braking condition, and (f) selector means manually operable in one direction to effect operation of said two-position switch devices respectively from their one position to their second position in a selected sequence and operable in a reverse direction to effect operation of said switch devices respectively from their second position to their said one position in a reverse sequence to provide progressively increasing degrees of brake control by said pneumatic controller upon movement of said selector means in one direction and progressively decreasing degrees of brake control by said pneumatic controller upon movement of said selector means in the reverse direction.

References Cited by the Examiner

UNITED STATES PATENTS

| | | | |
|---|---|---|---|
| 1,721,420 | 7/1929 | Sturner | 200—6 X |
| 2,857,528 | 10/1958 | Bertin | 307—113 X |
| 2,906,832 | 9/1959 | Foster et al. | 200—153 X |
| 3,071,658 | 1/1963 | Demarest | 200—5 |
| 3,118,707 | 1/1964 | Simmons et al. | 303—22 |
| 3,189,763 | 6/1965 | Chown | 307—113 |

EUGENE G. BOTZ, *Primary Examiner.*